(12) United States Patent
Xu et al.

(10) Patent No.: US 8,439,330 B2
(45) Date of Patent: May 14, 2013

(54) STEM SHOULDER SEAL WITH DOUBLE RINGS AND AN ASSEMBLY OF INDEPENDENT DUAL STEM SEALS

(75) Inventors: Changxiang Xu, Wenzhou (CN); Mao Yang, Wenzhou (CN); Zhanji Chen, Wenzhou (CN)

(73) Assignees: Zhejiang China Value Co., Ltd., Wenzhou (CN); Changxiang Xu, Wenzhou (CN)

( * ) Notice: Subject to any disclaimer, the term of this patent is extended or adjusted under 35 U.S.C. 154(b) by 0 days.

(21) Appl. No.: 13/096,579

(22) Filed: Apr. 28, 2011

(65) Prior Publication Data

US 2011/0297863 A1    Dec. 8, 2011

Related U.S. Application Data

(63) Continuation of application No. PCT/CN2009/000282, filed on Mar. 17, 2009.

(51) Int. Cl.
    *F16K 41/18* (2006.01)
(52) U.S. Cl.
    USPC ............ 251/214; 251/314; 277/502; 277/529
(58) Field of Classification Search .................. 251/314, 251/317, 315.01, 214; 277/339, 502, 510, 277/511, 512, 529, 531
    See application file for complete search history.

(56) References Cited

U.S. PATENT DOCUMENTS

| | | | | | |
|---|---|---|---|---|---|
| 778,430 | A | * | 12/1904 | Stewart | 277/536 |
| 789,141 | A | * | 5/1905 | Sullivan | 277/531 |
| 1,022,341 | A | * | 4/1912 | Chesterton | 277/531 |
| 3,186,681 | A | * | 6/1965 | Lowrey | 251/214 |
| 3,235,272 | A | * | 2/1966 | Smith | 277/399 |
| 3,425,663 | A | * | 2/1969 | Priese | 251/180 |
| 3,582,041 | A | * | 6/1971 | Priese | 251/304 |
| 3,586,289 | A | * | 6/1971 | Priese | 251/214 |

(Continued)

FOREIGN PATENT DOCUMENTS

| | | |
|---|---|---|
| CN | 1227321 | 9/1999 |
| CN | 2512960 | 9/2002 |

(Continued)

OTHER PUBLICATIONS

International Search Report for international application No. PCT/CN2009/000282, dated Aug. 6, 2009 (7 pages). 52835 Customer Number.

*Primary Examiner* — Eric Keasel
*Assistant Examiner* — Time Aigbe
(74) *Attorney, Agent, or Firm* — Hamre, Schumann, Mueller & Larson, P.C.

(57) ABSTRACT

A stem shoulder seal with double rings is composed of a sealing ring, a clamping ring and a spherical or conical stem shoulder, and the sealing ring is of a self-energized seal designed to its ultimate allowable strength and automatically free of any load beyond its ultimate strength. An assembly of independent dual stem seals, consisting of a stem shoulder seal with double rings, a stem cylinder seal with triangular sections and an isolating mating, can ensure that a stem has three seals which get well seated automatically at the same time to bear an identical ultimate medium pressure independently or without any mutual interference in service when assembled to the extent that the stem operating torque is just definitely increased, thereby ensuring that a stem sealing has a triple safety.

4 Claims, 1 Drawing Sheet

U.S. PATENT DOCUMENTS 4,617,957 A * 10/1986 Sandling .................. 137/315.26
5,407,176 A * 4/1995 Nevrekar ...................... 251/214
2008/0231000 A1* 9/2008 Xu ................................ 277/614

FOREIGN PATENT DOCUMENTS

| CN | 200510097905.6 | * | 8/2005 | .................. 277/614 |
| CN | 1920363 | | 2/2007 | |
| CN | 101201134 | | 6/2008 | |
| GB | 2105010 | | 3/1983 | |
| JP | 6307556 | | 11/1994 | |

* cited by examiner

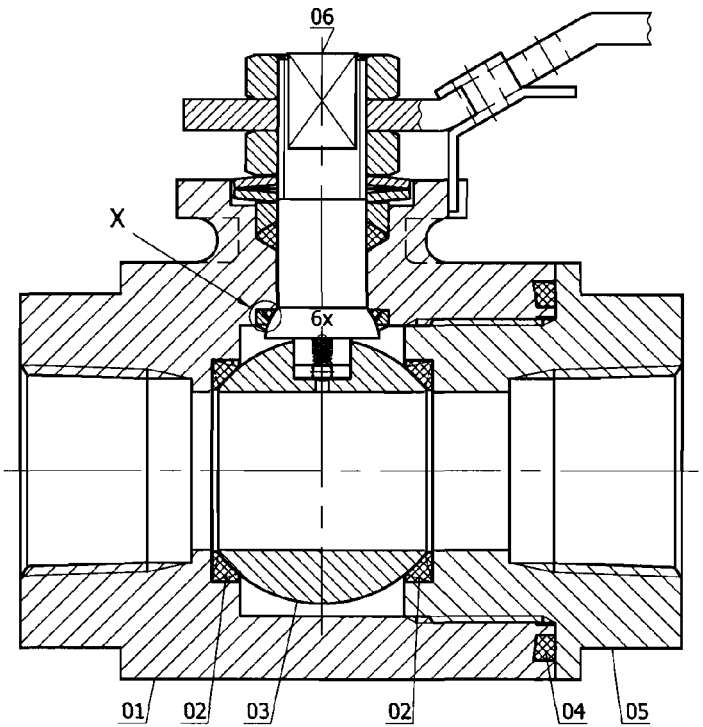
Fig.1
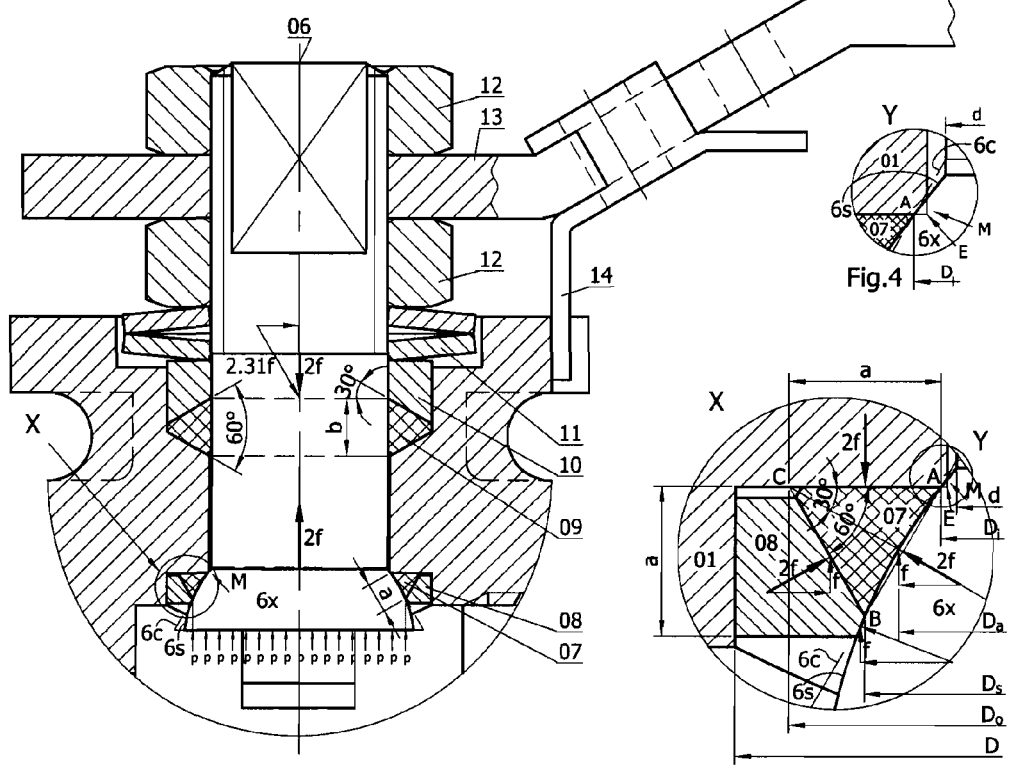
Fig.2
Fig.3
Fig.4

STEM SHOULDER SEAL WITH DOUBLE RINGS AND AN ASSEMBLY OF INDEPENDENT DUAL STEM SEALS

FIELD OF THE INVENTION

The invention relates to stem seals for ball valves used for fluid power and general use, and more particularly to a stem shoulder seal with double rings and an assembly of independent dual stem seals for ball valves.

BACKGROUND OF THE INVENTION

A ball valve is a kind of ball valves using a ball as the on-off member. The valve is fully open when turned to where the central through bore of the ball is coaxial with the valve passage, and fully closed when perpendicular to the valve passage. The turning of the on-off ball in its seats mounted by the valve body is controlled by a stem extending out of the valve body. The stem needs sealing to prevent medium from leaking along it. Some valves only have one seal either at stem cylinders or at stem shoulders, but most ball valves need the two.

The primary task of the stem shoulder of ball valves is to prevent the stem from being ejected out of the pressure boundary by internal pressure, and hence the stem shoulder seal and the stem cylinder seal are located respectively at the inside and the outside of a stem thrust step in valve bodies and fixed by a thread engagement of the nut and the threaded stem. The sealing of stem shoulders needs to provide an axial sealing stress on their shoulder, and the sealing of stem cylinders needs to provide a radial sealing stress on their cylinder. In other words, the two sealing stresses are perpendicular to each other and both originated by one thread engagement, so that it is difficult for them to be equally provided at the same time by one wrenching operation; i.e. unless specially designed, the stem shoulder seal and the stem cylinder seal can not get well seated at the same time during assembly to be two independent leak-free stem seals under ultimate medium pressure. Besides, the medium pressure on the stem end is an increasing load to the stem shoulder seal, and a decreasing load to the stem cylinder seal, so that the two seals, unless specially designed, can not also bear an identical ultimate medium pressure independently in services.

The conventional stem cylinder seal is a design for axially compressing the packing material around the stem in the stuffing box. Since the sealing materials are non-rigid and compressible, it is beyond any doubt that any section of shaped packing rings in sets will deform into a heap or lump of packing to lose their mechanical characteristic in rigid sections and only to be equivalent to a plain gasket when compressed to some extent. Since the Poisson's ratio (radical strain/axial strain) of usual sealing materials is less than 0.5, for example, PTFE has a Poisson's ratio of 0.46, any shape of packing rings compressed into a heap of packing and equivalent to a plain gasket can not effectively provide a sufficient radial sealing stress needed for the sealing of stem cylinders. It is imaginable that the flexible graphite in the stuffing box must deform into a lump of packing when compressed to some extent, and if such a lump could provide an radial sealing stress effectively, any premanufactured flexible graphite plain gasket could be never used as a seal of any end faces; however, the flexible graphite plain gasket has been widely used as flange seals, which means that the lump of flexible graphite can hardly radially deform or effectively provide a radial stress when axially compressed. Therefore, the conventional stem cylinder seal is only of an inefficient sealing design.

The conventional stem shoulder seal is a design of plain gaskets compressed axially. The stem shoulder sealing stress is generated from a thin plain gasket and proportional to its Poisson's axial strain, thereby increasing quickly in assembling; while the stem cylinder sealing stress is generated from a thick packing and proportional to its Poisson's radial strain less than its Poisson's axial strain at least by 50%, thereby increasing slowly in assembling; i.e. in assembling, the stem shoulder seal and the stem cylinder seal can not get well seated at the same time by one compression force from the thread engagement of the nut and the threaded stem. In services, the stem shoulder sealing is strengthened and the stem cylinder sealing is weakened under medium pressure; i.e. in service, the stem shoulder seal and the stem cylinder seal can not also function effectively at the same time. As a result, very often the stem cylinder seal can not yet function when the stem shoulder seal material is compressed to be crushed.

The previous patent CN1920363A attempts to use a triangular section of stem cylinder seals and a ball wedge/spherical seat mating of stem shoulder seals to ensure that the two seals get well seated automatically at the same time during assembly to bear an identical ultimate medium pressure independently in service. However, the ball wedge/spherical seat mating causes the stem shoulder seal to have a slightly big operation torque.

SUMMARY OF THE INVENTION

The first object of the invention is to prevent the stem from being always pressed outwards by the internal pressure of a valve body, and the second object is to ensure the stem cylinder seal and the stem shoulder seal can get well seated automatically at the same time during assembly to bear an identical ultimate medium pressure independently in services.

The means to achieve the first object of the invention is a stem shoulder seal with double rings, composed of a sealing ring, a clamping ring and a spherical or conical stem shoulder (see FIGS. 2 and 3), wherein the said sealing ring is made of low strength material and responsible for sealing the said stem shoulder and the valve body, the said clamping ring is made of high strength material and responsible for pressing the said sealing ring tight, and the said stem shoulder is assembled to press at the same time the said sealing ring and the said clamping ring supported mutually; the said sealing ring is of an equilateral triangle (ABC) section: the surface formed by rotating arc AB opposite to side AB of the said triangle ABC is the sealing surface of the said spherical stem shoulder, the surface formed by rotating side AB is the sealing surface of the said conical stem shoulder, the surface formed by rotating side BC is the clamped surface of the said sealing ring, and the surface formed by rotating side CA is the sealing surface of the said valve body and perpendicular to the axis of the said stem; and the said clamping ring is of a trapezoid section, whose height side is the generatrix of the cylindrical surface of the said clamping ring, between which and whose accommodating bore in the valve body is a clearance fit, and whose oblique side is the generatrix of the conical surface for clamping the said sealing ring. When assembled, the stem cylinder seal assembly is pressed on the outside of the stem thrust step in the valve body by the nut engaged with the threaded stem, and at the same time the sealing ring and clamping ring are also at the same time pressed on the inside of the stem thrust step by the stem shoulder. The sealing ring of the stem shoulder is of an equilateral triangle (ABC) section, and its valve body sealing surface is perpendicular to the axis of the stem, so that, when supposing the equal acting force on each surface of the sealing ring to be 2f, the 2f on the stem shoulder sealing surface AB includes an axial clamping component f from the stem, and the 2f on the clamped conical surface BC includes the other axial clamping component f from the stem which is used as the wedging force of the clamping ring; i.e. the axial pressing force 2f from the stem shoulder is equally shared by the sealing ring and the clamping ring to result in the sealing ring having an equal acting force 2f on its each surface. In services, the medium pressure on the clamping ring, after amplified twice as much by the clamping ring wedge, is exerted on the sealing ring, but the clamping ring is clear of its accommodating wall and bottom in the valve body only to have a smaller axial effective medium actuation area; i.e. the medium pressure on the clamping ring can only replace a part of its axial pressed force from the stem shoulder to enhance the stem shoulder seal (because such a replacing means reducing the resistance f of the clamping ring to the stem shoulder and enlarging the resistance 2f of the sealing ring to the stem shoulder) or to weaken the outward pressing power on the stem end (because such a replacing means moving the medium pressure from the clamping ring onto the stem shoulder to offset some pressure on the stem end) or to prevent the stem from being always pressed outwards by the internal pressure. When the spherical or conical shoulder is assembled for its crest to press the stem thrust edge in the valve body tight to some extent, the stem thrust edge can not only thoroughly prevent the stem from being outwards pressed and thereby prevent the cylinder seal from being unloaded by the medium pressure on the stem end, but also thoroughly stop the stem shoulder seal from being freely loaded by the medium pressure on the stem end and by the clamping force from the stem shoulder.

Since the initial seating stress of the stem shoulder seal with double rings is determined automatically by the suitable yield deformation of the sealing ring during assembly, and the following self-sealing stress is determined by the suitable axial effective medium actuation area of the clamping ring in service, the stem shoulder sealing stress can be self-adaptive to such a degree just needed or sufficient but not waste. The sealing ring of the stem shoulder seal is of an equilateral triangle section, features an equal action force and an unequal bearing area (due to a different radius) for its each surface, and just ideally satisfies the needs of unequal stresses for its each surface: the high stress on its spherical or conical sealing surface is just its need for its dynamic sealing of the stem shoulder, the intermediate stress on its body-sealing surface is just its need for its static sealing of the valve body, and the low stress on its supported conical surface is just its needs for its sliding on the clamping ring, thereby resulting in the design and the material of the stem shoulder seal with double rings being just what it needs. As the sealing ring of the stem shoulder seal is under enclosed compression, it is like the hydraulic oil in cylinders with no compressive deformation, no extrusive deformation or rupture and nowhere to creep, and has an actual bearing strength far higher than its material allowable strength. Therefore, the stem shoulder seal with double rings of the invention is the most ideal design for stem shoulder seals, both so flexible and so rigid as to be capable of satisfying requirements of both sealing deformation and high pressure service, and features a high sealing efficiency, a long service life, a good reliability, etc.

The means to achieve the second object of the invention is an assembly of independent dual stem seals, composed of a stem shoulder seal with double rings as above-mentioned, an optional stem cylinder seal and an isolating mating, wherein the said isolating mating is located between the said stem shoulder seal and the said stem cylinder seal, composed of a stem thrust edge on the valve body and a stem neck root or a crest of the said spherical or conical stem shoulder, and used for preventing the clamping force for the said assembly from being excessively applied to the said stem shoulder seal and for stopping the medium pressure on the stem end from freely loading the said stem shoulder seal and from freely unloading the said stem cylinder seal. As shown in FIG. 2, as engaged with the threaded stem for fixing the stem seal assembly, the nut presses the gland of the stem cylinder seal by an axial force 2f, while the stem shoulder presses the sealing ring and the clamping ring of the stem shoulder seal by a counter axial force 2f at the same time. After the spherical or conical shoulder is assembled for its crest to press the stem thrust edge in the valve body tight to some extent, the stem cylinder seal can only continue to be loaded by the nut engaged with the threaded stem but can not be unloaded by the medium pressure on the stern end, while the stem shoulder seal can only continue to be loaded by the medium pressure on the clamping ring but neither by the medium pressure on the stem end nor by the nut engaged with the threaded stem, thus making the stem shoulder seal and the stem cylinder seal each be finally loaded separately and not mutually influenced to reach their each best sealing need. If the stem cylinder seal is of equilateral triangle sections, as shown in FIG. 2, its axial clamping force 2f from the nut can be amplified $2/\sqrt{3}=1.155$ times as much by its gland to become a radial pressure $2.31f$ on the stem; i.e. when the axial clamping force for the stem seal assembly is 2f, the sealing load of the stem shoulder is 2f and the sealing load of the stem cylinder is 2.31f. Since $2.31f/2f=1.155$, having b (the side length of the stem cylinder seal ring section triangle)=a (the side length of the stem shoulder seal ring section triangle) just enables the stem shoulder seal, which has a seating stress smaller than that of the stem cylinder seal during assembly and has an increase of self-sealing stress from the medium pressure on its clamping ring in service, to satisfy its requirement in service at ultimate medium pressure independently or to be matched with the cylinder seal assembled to satisfy its requirement for service at ultimate medium pressure independently. Therefore, to make the isolating mating be the third seal should be to have a side length b longer than the side length a in order to satisfy the need of increasing the axial clamping force for the third seal or preventing the overload of the stem cylinder seal caused by increasing the axial clamping force for the third seal.

The initial seating stress of a stem shoulder seal with double rings during assembly is determined automatically by the suitable yield deformation of its sealing ring, and its matchability with its stem cylinder seal with triangular sections is determined by their two sectional triangle side lengths, and hence the two seals, when designed correctly and assembled to the extent that the stem operating torque is just definitely increased or that the isolating mating itself just gets free of leak, can ensure that they each get well seated at the same time during assembly to bear an identical ultimate medium pressure independently in service, thereby ensuring that a stem sealing has a double safety. Since the axial clamping force of the stem cylinder seal with triangular sections during assembly is far smaller than that of the conventional packing stem cylinder seal and the mated rotation radius of the stem shoulder seal with double rings is far less than that of the conventional stem shoulder seal, the operation toque of the assembly of independent dual stem seals is less than that of the conventional stem seal. Since the stem shoulder seal with double rings is of a self-energized seal and the stem cylinder seal is always redundant as long as the stem shoulder seal with double rings does not fail, the stem shoulder seal can be checked in its service to see its leak by unloading the stem cylinder seal; if the stem shoulder seal fails, the sealing of the stem can be maintained by the stem cylinder seal to allow the system to continue operating until a scheduled repair of the stem shoulder seal. Since the failure of the stem seal is primarily caused by the stem shoulder seal, the stem sealing can almost get rid of any sudden accident by a scheduled check of the stem shoulder seal. Since the sealing ring of the stem shoulder seal has an actual bearing strength higher than its material allowable strength and its sealing stress can be self-adaptive to such a degree just needed, the stem shoulder seal with double rings can hardly fail designed for its sealing ring in accordance with the ultimate medium pressure and the material's allowable load. Therefore, the assembly of independent dual stem seals consisting of a stem shoulder seal with double rings and a stem cylinder seal with triangular sections is the most ideal ball valve stem seal.

BRIEF DESCRIPTION OF DRAWINGS

FIG. 1 is a usual floating ball valve in its fully open position, where the valve seat 02 is responsible for providing the mounting joint, the rotating support and the closing seal for the on-off ball 03 in the valve body 01, the fastening engagement of the valve end cap 05 and the valve body by threads is responsible for providing the mounting or fixing of the seat and the ball in the valve body, the gasket 04 is responsible for providing the sealing of valve body joint, and the stem 06 including a spherical or conical stem shoulder 6x is responsible for providing the rotation operation of the on-off ball. The stem shoulder 6 can be spherical stem shoulder 6s or a conical stem shoulder 6c.

FIG. 2 is an enlargement of the partial sectional view of the valve stem assembly in FIG. 1, where the sealing ring 07, the clamping ring 08 and the stem shoulder 6x of the stem 6 constitute a stem shoulder seal with double rings of the invention, the triangle-sectional sealing ring 09 and the gland 10 constitute a stem cylinder seal of the assembly of independent dual stem seals of the invention, the Belleville washer 11 is responsible for providing the compensation of the stem cylinder seal and an isolating mating M for their wearing and unloading, the lower nut 12 is responsible for fixing and loading the stem seal assembly, the upper nut 12 is responsible for fixing the handle 13, and the lock 14 is responsible for locking the fully open/closed positions of the ball valve.

FIG. 3 is an enlargement of the partial view X in FIGS. 1 and 2. As shown near point A in the drawing, a stem neck root or a crest of the stem shoulder 6x of the stem 06 and its thrust edge E in the valve body 01 constitute an isolating mating M of the assembly of independent dual stem seals of the invention, and the stem thrust edge E has become a cambered or conical surface, which may be considered naturally formed in the stem assembling process.

FIG. 4 is an enlargement of the partial view Y in FIG. 3 detailing the isolating mating M of the stem shoulder 6 to its thrust edge E naturally deformed during assembling or working where the stem thrust edge E mated to the stem shoulder 6x, under a certain assembling or working pressure, has become as somewhat spherical or conical as the spherical stem shoulder 6s or the conical stem shoulder 6c is.

DETAILED DESCRIPTION OF THE INVENTION

As shown in FIGS. 2 and 3, a stem shoulder seal with double rings of the invention is composed of a sealing ring 07, a clamping ring 08 and a spherical stem shoulder 06; the sealing ring is made of low strength material and responsible for sealing the stem shoulder and the valve body 01, the clamping ring is made of high strength material and responsible for pressing the sealing ring tight, and the stem shoulder is assembled to press at the same time the sealing ring and the clamping ring supported mutually; the sealing ring is of an equilateral triangle (ABC) section: the surface formed by rotating side AB of the triangle ABC is the premanufactured sealing surface of the spherical stem shoulder, whose spherical sealing surface is naturally formed in the stem assembling process, the surface formed by rotating side BC is the clamped surface of the sealing ring, and the surface formed by rotating side CA is the sealing surface of the valve body and perpendicular to the axis of the stem; and the clamping ring is of a trapezoid section, whose height side is the generatrix of the cylindrical surface of the clamping ring, between which and whose accommodating bore in the valve body is a clearance fit, and whose oblique side is the generatrix of the conical surface for clamping the sealing ring. When assembled, the stem cylinder seal assembly is pressed on the outside of the stem thrust step in the valve body 01 by the lower nut 12 engaged with the threaded stem 06, and at the same time the sealing ring 07 and the clamping ring 08 are also at the same time pressed on the inside of the stem thrust step by the stem shoulder 06. The sealing ring 07 of stem shoulder seal is of an equilateral triangle (ABC) section, and its valve body sealing surface is perpendicular to the axis of the stem, so that, supposing the equal acting force on each surface of the sealing ring to be 2f, it can be seen that the 2f on the stem shoulder sealing surface AB needs an axial clamping component f from the stem, and the 2f on the clamped conical surface BC needs the other axial clamping component f from the stem which is used as the wedging force of the clamping ring; i.e. the axial pressing force 2f from the stem shoulder is equally shared by the sealing ring and the clamping ring to result in the sealing ring having an equal acting force 2f on its each surface. When the spherical shoulder is assembled for its crest to press the stem thrust edge in the valve body tight to some extent, the stem thrust edge can not only thoroughly prevent the medium pressure on the stem end from causing the outward movement of the stem to unload the cylinder seal, but also thoroughly prevent the stem shoulder seal from being overloaded by the medium pressure on the stem end and by the stem fixing force 2f from the stem shoulder. To enable the clamping ring 08 to effectively compress the sealing ring 07, the clamping ring needs be clear of its accommodating wall and bottom in the valve body and the sealing ring needs be truncated a bit at its corner C. It is just because of the two clearances that the clamping ring can only have a small axial effective medium actuation area, and the medium pressure on it, though capable of being amplified twice as much by its wedging function to add on the sealing ring, can only replace a part of its axial pressed force from the stem shoulder to enhance the stem shoulder seal (by reducing the resistance f of the clamping ring to the stem shoulder and enlarging the corresponding resistance 2f of the sealing ring to the stem shoulder) or to weaken the outward pressing power on the stem end (by moving the medium pressure from the clamping ring onto the stem shoulder to offset some pressure on the stem end) or to prevent the stem from being always pressed outwards by the internal pressure.

The first, as shown in FIG. 3, the sealing ring of the stem shoulder seal with double rings can not deform to flow to result in the stem shoulder being pressed tight on its stem thrust edge until its sealing material yield whether under the stem assembling force or under the ultimate medium pressure, and once the stem shoulder is pressed tight on its stem thrust edge, any increase of pressure from the stem shoulder can only add on its thrust edge in the valve body but not on its sealing ring. The second, if suitably truncated at the corner C, the sealing ring will move towards its corner C as its material yields for its redundant material to be squeezed into the corner C whether under the assembling force or under the ultimate medium pressure, and once the redundant material is squeezed out, the clamping ring will bear a more share of the pressure from the stem shoulder to prevent the stress of the sealing ring from further increasing; i.e. the sealing ring will never have a load stress beyond its ultimate tensile strength. Additionally, suitably increasing the side length a of the equilateral triangle ABC of the sealing ring section based on keeping a constant diameter of the outer edge of the final sealing ring (or manufacturing the sealing ring according to $a^{+t}$ with a suitable value of t) can precisely control the assembling compression allowance of the sealing ring and keep the matchability of the assembling compression allowance and the truncated corner C in volume to eliminate the influence of manufacturing deviation. As a result, the design of the stem shoulder seal with double rings can ensure that the sealing ring never has a load stress beyond its ultimate tensile strength, however soft the sealing ring is, however large the stem assembling force is, however great the medium pressure is and whatever the manufacturing deviation is. Since the axial medium pressure (actuation area) on the clamping ring is only about a third of the axial medium pressure (actuation area) on the stem end, the sealing ring will never have a load beyond its designed load after its stem shoulder presses its stem thrust edge tight, if designed according to bearing the ultimate medium load on its stem end. Therefore, the stem shoulder seal with double rings is absolutely safe and reliable if the sealing ring is designed according to bearing the ultimate medium load on its stem end, and the clamping ring, according to a pipe bearing the medium pressure equivalent to the material's ultimate allowable strength of the sealing ring. Thus, based on that the ultimate medium load on the stem end is equal to the allowable load of the spherical sealing surface of the sealing ring (see FIG. 3):

$$\pi \frac{D_s^2}{4} P_{max} = \pi D_a a \sigma$$

$$\pi \frac{D_s^2}{4} P_{max} = \pi \frac{D_s + D_i}{2} * \frac{D_s - D_i}{2\sin 30°} \sigma$$

$$D_s^2 P_{max} = 2(D_s^2 - D_i^2)\sigma$$

$$(2\sigma - P_{max})D_s^2 = 2\sigma D_i^2$$

$$\sqrt{2\sigma - P_{max}}\, D_s = \sqrt{2\sigma}\, D_i$$

$$\sqrt{2\sigma - P_{max}}\, [(D_o + D_i)/2] = \sqrt{2\sigma}\, D_i$$

the outside diameter $D_o$ of the sealing ring and the side length a of its equilateral triangle section ABC can be got:

$$D_o = \left(\sqrt{\frac{8\sigma}{2\sigma - p_{max}}} - 1\right) D_i$$

$$a = (D_o - D_i)/2$$

where
$\sigma$=the allowable strength of the sealing ring, which may be its compressive strength.

$P_{max}$=the ultimate medium pressure=1.5p (p=the valve pressure rating)
$D_i$=the inner diameter of the sealing ring, which may be $d+0.6_{max}$ (d=the stem diameter).
If made of low carbon steel, the clamping ring can meet the requirements when simply letting its outside diameter D=1.5d and its height=a−δ (δ=the axial clearance needed for its clamping operation).

As shown in FIGS. 2 and 3, an assembly of independent dual stem seals of the invention is composed of a stem shoulder seal with double rings as above-mentioned, a stem cylinder seal with triangular sections 09 and an isolating mating which is located between the stem shoulder seal and the stem cylinder seal, composed of a stem thrust edge on the valve body and a stem neck root or a crest of the spherical stem shoulder 06, and used for preventing the clamping force 2f for the stem seal assembly from being excessively applied to the stem shoulder seal and for stopping the medium pressure p on the stem end from continuously loading the stem shoulder seal and from continuously unloading the stem cylinder seal. As shown in FIG. 2, as engaged with the threaded stem 06 for fixing the stem seal assembly, the lower nut 12 presses the gland 10 of the stem cylinder seal by an axial force 2f through two Belleville washers 11, while the stem shoulder of stem 06 presses the sealing ring 07 and the clamping ring 08 of the stem shoulder seal by a counter axial force 2f at the same time. After the spherical shoulder is assembled for its crest to press the stem thrust edge in the valve body tight to some extent, the stem cylinder seal can only continue to be loaded by the nut engaged with the threaded stem but can not be unloaded by the medium pressure p on the stem end, while the stem shoulder seal can only continue to be loaded by the medium pressure p on the clamping ring but neither by the medium pressure p on the stem end nor by the nut engaged with the threaded stem, thus making the stem shoulder seal and the stem cylinder seal each be finally loaded separately and not mutually influenced to reach their each best sealing need. Since the axial clamping force 2f from the nut 12, as shown in FIG. 2, can be amplified $2/\sqrt{3}=1.155$ times as much by the gland 10 to become a radial pressure 2.31f on the stem 06 because the stem cylinder seal ring 09 is of an equilateral triangle section, or since the sealing load of the stem shoulder will be 2f and the sealing load of the stem cylinder will be 2.31f and 2.31f/2f=1.155 when the axial clamping force for the stem seal assembly is 2f, having b (the side length of the stem cylinder seal ring section triangle)=a (the side length of the stem shoulder seal ring section triangle) just enables the stem shoulder seal, which has a seating stress smaller than that of the stem cylinder seal during assembly and has an increase of self-sealing stress from the medium pressure on its clamping ring in service, to satisfy its requirement in service at ultimate medium pressure independently or to be matched with the cylinder seal assembled to satisfy its requirement for service at ultimate medium pressure independently. Therefore, to make the isolating mating be the third seal should be to have a side b longer than the side a in order to satisfy the need of increasing the axial clamping force for the third seal or preventing the overload of the stem cylinder seal caused by increasing the axial clamping force for the third seal.

If a heap or lump of packing instead of an equilateral triangle section of rings, the stem cylinder seal will need a larger axial clamping force to get well seated radially on its stem and to be as an independent competent stem seal because its changing of an axial clamping force into a radial sealing force is dominated by the Poisson's deformation ratio. If an equilateral triangle section of rings, the stem cylinder seal will only need a smaller axial clamping force to get well seated radially on its stem and to be as an independent competent stem seal because its changing of an axial clamping force into a radial sealing force is determined by a 30° right triangle for vector addition or net force. Or rather, the factor of changing the axial clamping force into the radial sealing force is at most 0.5 for a packing design of stem cylinder seals and is $2/\sqrt{3}=1.155$ for a triangular section design of stem cylinder seals. Accordingly, the rotation resistance of an isolating mating for use with a conventional packing design of stem cylinder seals is far greater than that for use with a triangular section design of stem cylinder seals, whose ratio can be $2/\sqrt{3}/0.5=2.31$ at least. Additionally, as mentioned above, suitably controlling the ratio of the side length b of the stem cylinder seal ring section triangle to the side length a of the stem shoulder seal ring section triangle can ensure that the stem shoulder seal and the stem cylinder seal get well seated at the same time to be as two independent competent stem seals when assembled to get the isolating mating just available, thus minimizing the contact pressure and rotation resistance of the isolating mating. Therefore, the stem cylinder seal with triangular sections is the most ideal stem cylinder seal for forming an assembly of independent dual stem seals of the invention.

The invention claimed is:

1. A stem shoulder seal with double rings, comprising:
a sealing ring, a clamping ring and a spherical or conical stem shoulder,
wherein the sealing ring is made of a low strength material and responsible for sealing the spherical or conical stem shoulder and a valve body, the clamping ring is made of a high strength material and responsible for pressing the sealing ring tight, and the spherical or conical stem shoulder is assembled to press at the same time the sealing ring and the clamping ring supported mutually;
the sealing ring has a cross-sectional shape of an equilateral triangle (ABC), the sealing ring including: a first surface formed by revolving an arc opposite a first side AB of the triangle ABC or by revolving the first side AB around an axis of a valve stem, the first surface engaging a surface of the spherical or conical stem shoulder for sealing the spherical or conical stem shoulder, a second surface formed by revolving a second side BC around the axis of the valve stem, the second surface of the sealing ring engaging the clamping ring, and a third surface formed by revolving a third side CA around the axis of the valve stem, the third surface being perpendicular to the axis of the valve stem for sealing a surface of the valve body; and
the clamping ring has a cross-sectional shape of a truncated right trapezoid, a first side and a second side of the truncated right trapezoid are parallel with each other and perpendicular to an axis of a valve stem, a height side of the truncated right trapezoid is the generatrix of a cylindrical surface of the clamping ring, the clamping ring being accommodated by a bore of the valve body that has a clearance fit with the cylindrical surface, an oblique side of the truncated right trapezoid is the generatrix of a conical surface of the clamping ring, the conical surface engaging the third surface of the sealing ring for clamping the sealing ring, a fifth side of the truncated right trapezoid is formed by cutting away an acute corner formed by the oblique side and the second side of the truncated right trapezoid, the fifth side is the generatrix of an engaging surface of the clamping ring that is pressed against by the surface of the spherical or conical stem shoulder.

2. An assembly of independent dual stem seals, comprising the stem shoulder seal with double rings in accordance with claim 1, a stem cylinder seal and an isolation engagement, wherein the isolation engagement is located between the stem shoulder seal and the stem cylinder seal, the isolation engagement is formed by mating a stem thrust edge on the valve body and a crest of the spherical or conical stem shoulder, and when the isolation engagement is formed, the stem shoulder seal and the stem cylinder seal are seated at the same time.

3. The assembly of independent dual stem seals in accordance with claim 2, wherein the sealing ring of the stem cylinder seal has a cross-sectional shape of an equilateral triangle.

4. The assembly of independent dual stem seals in accordance with claim 2, wherein the sealing ring of the stem cylinder seal has a cross-sectional shape of an equilateral triangle with a side length not less than that of the sealing ring of the stem shoulder seal.

* * * * *

UNITED STATES PATENT AND TRADEMARK OFFICE
CERTIFICATE OF CORRECTION

PATENT NO. : 8,439,330 B2  
APPLICATION NO. : 13/096579  
DATED : May 14, 2013  
INVENTOR(S) : Xu et al.

Page 1 of 1

It is certified that error appears in the above-identified patent and that said Letters Patent is hereby corrected as shown below:

Title page: after "(63) Continuation of application No. PCT/CN2009/000282, filed on Mar. 17, 2009." insert the following:

-- (30)    Foreign Application Priority Data

Oct. 28, 2008    (CN) ........................... 200810172830.7 --

Signed and Sealed this
Seventeenth Day of February, 2015

Michelle K. Lee
*Deputy Director of the United States Patent and Trademark Office*